United States Patent
Jadhav

(10) Patent No.: US 9,023,244 B2
(45) Date of Patent: May 5, 2015

(54) CAPTURE OF $CO_2$ FROM HYDROGEN PLANTS

(71) Applicant: Raja A. Jadhav, Benicia, CA (US)

(72) Inventor: Raja A. Jadhav, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 68 days.

(21) Appl. No.: 13/843,629

(22) Filed: Mar. 15, 2013

(65) Prior Publication Data

US 2014/0186257 A1    Jul. 3, 2014

Related U.S. Application Data

(60) Provisional application No. 61/747,746, filed on Dec. 31, 2012.

(51) Int. Cl.
| | |
|---|---|
| *C01B 3/38* | (2006.01) |
| *C01B 3/24* | (2006.01) |
| *C01B 31/20* | (2006.01) |
| *B01D 53/04* | (2006.01) |
| *C01B 3/50* | (2006.01) |

(52) U.S. Cl.
CPC ............... *C01B 31/20* (2013.01); *C01B 3/382* (2013.01); *B01D 53/0462* (2013.01); *C01B 3/24* (2013.01); *C01B 3/508* (2013.01); *C01B 3/38* (2013.01); *C01B 2203/0233* (2013.01); *C01B 2203/0244* (2013.01); *C01B 2203/0288* (2013.01); *C01B 2203/043* (2013.01); *C01B 2203/0475* (2013.01); *C01B 2203/063* (2013.01); *C01B 2203/0827* (2013.01); *C01B 2203/86* (2013.01); *B01D 2253/102* (2013.01); *B01D 2253/108* (2013.01); *B01D 2253/116* (2013.01); *B01D 2256/16* (2013.01); *B01D 2257/504* (2013.01); *B01D 2259/414* (2013.01)

(58) Field of Classification Search
CPC ........................................................ C01B 3/22
USPC ............... 48/197 R; 252/373; 95/99; 96/135; 423/650
See application file for complete search history.

(56) References Cited

U.S. PATENT DOCUMENTS

| | | | |
|---|---|---|---|
| 6,730,285 B2 * | 5/2004 | Aasberg-Petersen et al. ............... | 423/652 |
| 2005/0201929 A1 * | 9/2005 | Hershkowitz et al. ....... | 423/652 |
| 2008/0173585 A1 | 7/2008 | White et al. | |
| 2008/0176174 A1 | 7/2008 | White et al. | |
| 2010/0024476 A1 | 2/2010 | Shah | |
| 2010/0080754 A1 | 4/2010 | Fischer et al. | |
| 2010/0212495 A1 | 8/2010 | Gadkaree et al. | |

* cited by examiner

*Primary Examiner* — Stanley Silverman
*Assistant Examiner* — Syed Iqbal
(74) *Attorney, Agent, or Firm* — A. Stephen Zavell

(57) ABSTRACT

The invention includes a process which eliminates or reduces the $CO_2$ emissions from a steam methane reforming and autothermal reforming plant. The process preferentially uses temperature swing adsorption units which are employed to purify the hydrogen stream instead of more conventional solvent based aMDEA plants to remove the $CO_2$ from the gas stream when creating a higher purity hydrogen stream.

2 Claims, 2 Drawing Sheets

CAPTURE OF $CO_2$ FROM HYDROGEN PLANTS

CROSS-REFERENCE TO RELATED APPLICATIONS

This application claims benefit under 35 USC 119 of U.S. Provisional Patent Application No. 61/747,746 with a filing date of Dec. 31, 2012. In addition, application Ser. No. 61/747,778, filed on Dec. 31, 2012 is also incorporated herein by reference for all purposes.

FIELD OF THE INVENTION

The invention relates to the field of capturing $CO_2$ from a hydrogen plant and in particular capturing $CO_2$ from a process that produces hydrogen for use as a fuel or in petroleum or chemical operations.

BACKGROUND OF THE INVENTION

Steam methane reformer (SMR) plants often a widely employed in refineries to supply $H_2$ for various product upgrading operations. The SMR process produces a large amount of $CO_2$ which must be cleaned from hydrogen stream. In steam methane reformer plants and solvent based aMDEA is used to remove the $CO_2$ from the hydrogen stream. Newer conventional hydrogen plants may use pressure swing adsorption (PSA) units to purify the $CO_2$ from the hydrogen stream. In both these units large amounts of $CO_2$ at low concentration and pressure are emitted from the SMR furnace. Capture of this $CO_2$ using a post combustion amine based technology such as aMDEA is expensive. Autothermal reformer (ATR) units may be used to produce $CO_2$-free hydrogen at reduced costs. However, they require expensive air separation unit (ASU) to produce the oxygen. Also, the ASU requires a large amount of power, which itself results in additional $CO_2$ emissions.

A recent patent application US 2010/0080754 teaches a method of reducing the $CO_2$ emissions from the steam methane reformer plant by employing a temperature swing adsorption (TSA) unit in place of a traditional PSA unit. After the shift reactors, the fuel gas stream is sent to an aMDEA unit to remove majority of the $CO_2$ In the gas stream. The $CO_2$-free fuel gas stream is next sent to a TSA unit, which produces high-purity $H_2$ by adsorbing CO, $CH_4$ and any remaining $CO_2$ on an adsorbent. The TSA adsorbent bed is next regenerated by using high pressure and high temperature natural gas and steam and the off-gas is sent to the steam methane reformer as a high pressure feed. The steam methane reformer furnace is fueled by a portion of the pure hydrogen product. The patent, however, does not address how to reduce $CO_2$ emissions from an SMR plant that does not have an amine absorber upstream of the TSA unit.

SUMMARY OF THE INVENTION

The instant process is described vs. need to eliminate or substantially reduce the $CO_2$ emissions from reforming plants to address the global warming resulting from $CO_2$ emissions.

DETAILED DESCRIPTION OF THE PROCESS

Figure 1:
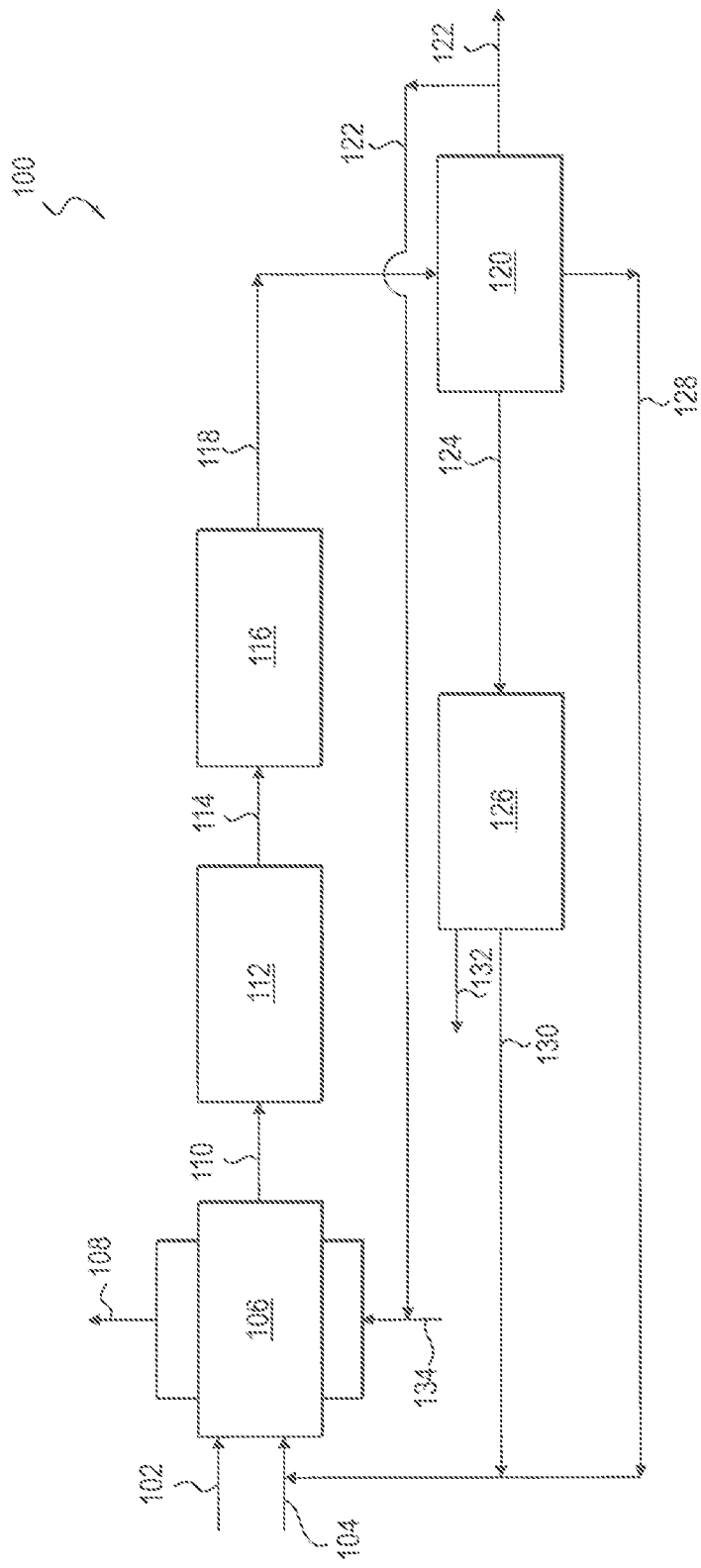
FIG. 1 is a process schematic of the steam methane reforming (SMR) process according to the invention.

Process will be more particularly described by referring to FIG. 1. Natural gas 104 and steam 102 are introduced into a steam methane reformer (SMR) 106. The volumes of natural gas vary from about 10,000 standard cubic ft per minute to about 2.5 million standard cubic ft per minute and the preferred range is adjusted for specific applications. The steam is introduced at a temperature of from about 300° C. to about 700° C. under a pressure of about 10 bar to about 30 bar. The products from the steam methane reformer 106 are sent to the heat recovery steam generator 112 via line 110. The cold product stream after the recovery of heat in the heat recovery steam generator (HRSG) 112 is sent to the high temperature/low temperature shift reactor 116 via line 114.

Natural gas and steam are sent to the reformer at high pressure from 10 to 30 bar to produce a syngas consisting of $H_2$+CO+$CO_2$ and unreacted $CH_4$ and $H_2O$. The syngas exiting the reformer is in the range of 800° C.-1100° C., which is cooled in a heat recovery steam generator (HRSG) to a temperature in the range 300° C.-400° C. The CO in the syngas is converted into $H_2$ using a high temperature water gas shift reaction mechanism known in the art. A low temperature water gas shift may also be used to convert remaining CO into $H_2$. The syngas stream which now contains greater than 70 vol. % $H_2$ is sent to a temperature swing adsorption (TSA) unit, which produces a pure $H_2$ stream at high pressure and the off gases also at high pressure of from about 10 bar to about 30 bar. The first off-gas stream contains primarily $CH_4$ and $CO_2$ at high temperature and pressure which is sent to a $CO_2$ removal process such as an amine, aMDEA or Benfield process, membrane or cryogenic unit for removal of the $CO_2$. The remainder of the first off-gas stream now contains mostly $CH_4$ with small amounts of CO. The second off-gas stream contains primarily $CH_4$ and steam at high pressure and temperature which is combined with the first off-gas stream that is cleaned and sent to the steam methane reformer as feed. Part of the produced $H_2$ is supplied as feel for the SMR furnace.

Element 120 the temperature swing adsorption element and the process of the invention therein is more particularly described hereinafter.

Figure 2:
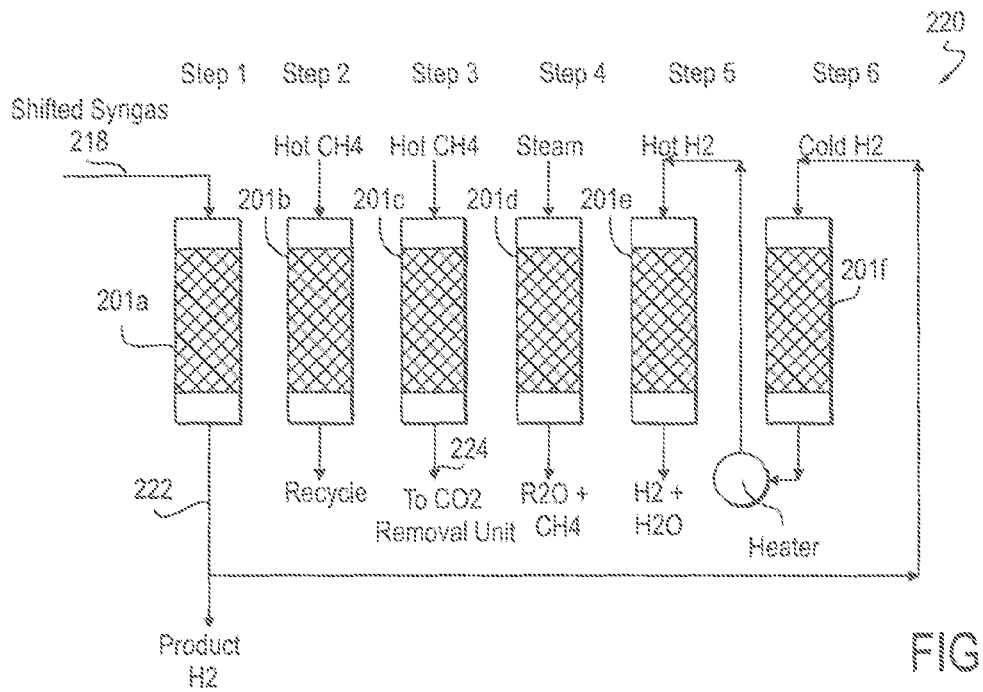
FIG. 2 is a more detailed illustration of a TSA unit 120 identified as 220 in FIG. 1 and sweeping with a $CH_4$ stream.

The first embodiment of the TSA process is described below, in which the adsorbent bed is "swept" in steps with $CH_4$, H2O and H2 streams as shown in FIG. 2. Any suitable adsorbent known in the art can be used as for example zeolites capable of adsorbing $CO_2$, CO, and $CH_4$ and $H_2O$ and the like.

The shifted gas feed 218 enters an adsorbent bed in the TSA illustrated as 220. In Step 1, the adsorbent bed adsorbs 201a-f all imparity gas components except hydrogen, thus a high purity $H_2$ stream is obtained at high pressure exiting at 222. Upon saturation of the bed which now consists of the imparities $CO_2$, CO, and $CH_4$ and $H_2O$ pins $H_2$ remaining within the bed voids, in Step 2, hot natural gas at high pressure greater than 20 bar and temperatures in excess of 200 to 300° C. is sent to the bed to remove the $CO_2$ along with the other components. Depending on the amount of $H_2$ trapped in the bed void volume, the $CO_2$ stream may be mixed with a significant amount of $H_2$. To decrease the amount of $H_2$ in the $CO_2$ stream, the initial portion of the exit stream in Step 2 that contains majority of the gases trapped in the void volume (including $H_2$), is compressed and recycled to be combined with the feed in Step 1. In Step 2, since the bed is still heating up from the low to high temperature, it can be expected that only minor amounts of the adsorbed components are released in the gas stream. Step 2 is optional and depends on the amount of $H_2$ trapped in the bed void volume. In Step 3, the natural gas "sweep" is continued to release much of the adsorbed $CO_2$ at the high temperature. The exiting gas stream is termed as the "first" off-gas stream, which primarily contains $CH_4$ and $CO_2$, exits via line 224 to a $CO_2$ removal process unit. Preferably, the $CH_4$ "sweep" flow rate is adjusted such that the concentration of $CO_2$ in the "first" off gas stream is in the range of 30 mol %-60 mol %, or more preferably 50 mol %-60 mol %. Although the $CO_2$ can be removed from other gaseous components using processes such as amine absorption (e.g., aMDEA) or membrane separation, a cryogenic process is preferred which removes $CO_2$ from other gases by partial condensation, such as those described in U.S. Patent Application Nos. US 2010/0024476, US 2008/0176174, and US 2008/0173585, incorporated herein by reference. Any $CH_4$ left in the $CO_2$ stream may be further removed by catalytic partial oxidation in the presence of pure $CO_2$ stream, thus increasing the purity of the $CO_2$ product stream which is further pressurized and may be used for enhanced oil recovery (EOR) or geologic storage. Optionally, the $CO_2$ can be solidified to "dry ice".

Returning now to the TSA element 220, at the end of Step 3, the bed is saturated with hot $CH_4$ with small amount of $CO_2$ remaining on the adsorbent. In Step 4, superheated steam is supplied at high temperature in the range 200° C. to 300° C. and at high pressure in the range 10-30 bar to the bed to remove the rest of the methane and the impurities and the "second" off-gas stream is obtained, which is mixed with the $CO_2$ free stream cut from the $CO_2$ removal unit and sent to the SMR unit 106 as a feed. The first and second off-gas stream compositions are adjusted in accordance with the inputs of natural gas and stream to optimize the outputs from the steam methane reformer 106. In Step 5, the bed which is now at a high temperature and saturated with steam, is purged with hot and pure $H_2$ stream produced in Step 1 after heat exchange. Most of the water in the bed is removed in this step. The purged $H_2$ stream is sent to the SMR furnace as a fuel or may be supplied as a product. Finally, in Step 6, the hot bed is cooled by supplying pure $H_2$ produced in Step 1 until the bed is cooled to a temperature of about 40-70° C. to repeat the process.

Figure 3:
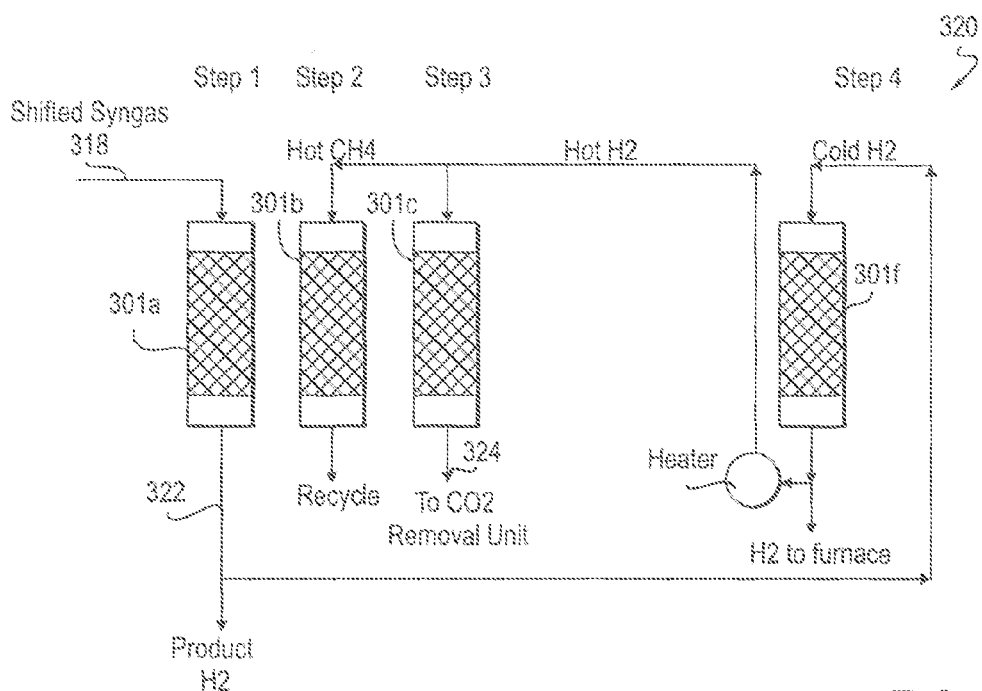
FIG. 3 is a more detailed illustration of a TSA unit 120 in FIG. 1 identified as 320 and sweeping with a $H_2$ stream.

The second embodiment of the TSA process is described below, in which the adsorbent bed is "swept" with a $H_2$ stream as shown in FIG. 3.

The shifted gas feed 318 enters the adsorbent bed 301a in the TSA element 320. The adsorbent bed contains suitable adsorbent material to adsorb the impurities from the feed stream containing $H_2$ to produce a purer $H_2$ stream. Any suitable materials such as $CO_2$, CO, $CH_4$ and $H_2O$ adsorbing zeolites, and the like can be used. In Step 1, the adsorbent bed adsorbs all components except hydrogen, thus a high purity $H_2$ stream is obtained at high pressure exiting at 322. Upon saturation of the bed which now consists of the impurities $CO_2$, CO, and $CH_4$ and $H_2O$ plus $H_2$ remaining within the bed voids, in Step 2, a portion of the product $H_2$ is heated to 200° C.-300° C. and is sent to the bed to remove the $CO_2$ along with the other components. Depending on the amount of $H_2$ trapped in the bed void volume in Step 1, the $CO_2$ stream may be mixed with a significant amount of $H_2$. To decrease the amount of $H_2$ in the $CO_2$ stream, the initial portion of the exit stream in Step 2 that contains majority of the gases trapped in the void volume (including $H_2$), is compressed and recycled to be combined with the feed in Step 1. In Step 2, since the bed is still heating up to the higher temperature, it can be expected that only minor amounts of the adsorbed components are released in the gas stream. Note that the Step 2 is optional and depends on the amount of $H_2$ trapped in the bed void volume. In Step 3, the $H_2$ "sweep" is continued to release much of the adsorbed $CO_2$ at the high temperature. The exiting gas stream is termed as the "first" off-gas stream, which primarily contains $H_2$ and $CO_2$ with minor amounts of $CH_4$ and CO, exits via line 324 to a $CO_2$ removal process unit. Preferably, the $H_2$ "sweep" flow rate is adjusted such that the concentration of $CO_2$ in the "first" off-gas stream is in the range of 30 mol %-95 mol %, or more preferably 60 mol % -95 mol %. Although the $CO_2$ can be removed from other gaseous components using processes such as amine absorption (e.g., aMDEA) or membrane separation, a cryogenic process is preferred which removes $CO_2$ from other gases by partial condensation, such as those described in U.S. Patent Application Nos. US 2010/0024476, US 2008/0176174, and US 2008/0173585, incorporated herein by reference. Separate high-purity streams of $CO_2$, $CH_4$ and $H_2$ can be obtained in the cryogenic unit. The $CH_4$-containing stream is sent as a feed to the SMR, whereas, the stream with majority of $H_2$ is sent as a fuel to the SMR furnace. The $CO_2$ product stream, after further pressurization, is sent for enhanced oil recovery (EOR) or geologic storage. Any combustible components left in the $CO_2$ stream (e.g., $CH_4$, CO, $H_2$) may be further removed by catalytic partial oxidation in the presence of pure $O_2$ stream, thus increasing the purity of the $CO_2$ stream.

If in the cryogenic $CO_2$ removal process only partial condensation is used to separate $CO_2$ from the other components, the vent stream that contains primarily $CH_4$ and $H_2$ may be recycled and mixed with the syngas feed to the TSA unit. This configuration would increase the overall $H_2$ recovery while being less complex. A small purge of the vent stream may be required in this case.

Returning now to the TSA element 320, at the end of Step 3, the bed is saturated with hot $H_2$ with small amount of $CO_2$ remaining on the adsorbent. In Step 4, a portion of the $H_2$ product is supplied at the lower temperature of 40° C.-70° C. to the bed to remove the rest of the $CO_2$ and the impurities. A portion of the gas exiting from Step 4, which is at a higher temperature, after further heat exchange with a medium such as steam, constitutes the hot $H_2$ streams for Steps 2 and 3 above. The remaining exit gas from Step 4 is termed as the "second" off-gas stream, which is mixed with the $H_2$ stream cut from the $CO_2$ removal unit and sent to the SMR unit as a fuel for the reformer furnace. When the process of the invention is applied to an autothermal reformer (ATR), which does not have a furnace, the $H_2$ stream is used as a fuel in other applications. At the end of Step 4, the bed is regenerated and cooled to a temperature of about 40-70° C. to repeat the process.

In the first embodiment, the pressure of the first off-gas stream can be adjusted by adjusting the pressure of natural gas feed to the bed. Preferably the TSA element 120 contains six or more beds (four or more beds in the second embodiment as illustrated) claiming the adsorbent that is made out of activated carbon or molecular sieves such as zeolites or silica gel. More than one type of adsorbent may be used in a single bed. Alternatively, the adsorbent material can be fitted in the bed in a structured monolithic format, which would increase the heat and mass transfer rates and decrease the adsorber pressure drop compared to a bed that contains adsorbent in granular or pellet format. One such example of a structured bed is given in the patent application US 2010/0212495 by Corning Inc., incorporated herein by reference. In that example, the sorbent structure comprises a continuous activated carbon body In the form of a flow-through substrate. The temperature of the sorbent structure can be increased by sending a hot gas stream through it and/or by passing a sufficient voltage across the sorbent structure, to provide resistive heating in a process called as electric swing adsorption (ESA). The advantage of heating the structured bed using resistive heating is that the amount of hot sweep gas stream can be reduced or eliminated, thus increasing the concentration of $CO_2$ in the stream that is sent to a $CO_2$ removal unit.

EXAMPLE

An example is given for embodiment 1 below for producing $H_2$ while recycling $CH_4$ to the SMR as a feed and producing a high concentration $CO_2$ stream for a $CO_2$ removal unit in a like manner the embodiment 2 would function to achieve a high purity $CO_2$ stream. Other variations are possible without departing from the spirit and scope of the invention.

In this example, the syngas flow rats after the low-temperature shift reactor, after removing water by condensation at 40° C., is 7000 kmol/h with the following composition (in mol %):

$CO_2$=19%, $H_2$=74.5%, CO=0.5%, $CH_4$=5.5%, $H_2O$=0.3%, $N_2$=0.2%. This syngas mixture at 27 bar is sent to a TSA unit, which consists of 6 beds packed with BPL carbon beads. Each bed has a dimension of approx. 7.5 m diameter and 5 m length and consists of about 120 tons of the adsorbent.

Step 1: The shifted gas feed 118 enters an adsorbent bed in the TSA element 120. The adsorbent bed adsorbs all components except hydrogen, thus a high purity $H_2$ stream (>99 mol %) is obtained at high pressure exiting at 122. This step is continued for 10 min. Upon saturation of the bed which now consists of the impurities $CO_2$, CO, and $CH_4$ and $H_2O$ plus $H_2$ remaining within the bed voids. The $H_2$ recovery is in the range 90-100%.

Step 2: The saturated bed is pressurized for 1-3 min with natural gas with flow rate in the range 100 kmol/h-2000 kmol/h and at a pressure greater than 20 bar and temperature in excess of 200 to 350° C. The pressure of the natural gas is selected such that the natural gas eventually recycled to the SMR as a feed has the appropriate pressure, matching the pressure of the SMR feed. The temperature of the natural gas is selected such that the bed is hot enough to avoid the condensation of steam that is used in Step 4. The natural gas is heated indirectly to the required temperature using steam or utilizing the heat energy available in other streams, such as streams exiting steps 3, 4 or 5 below. After the bed is pressurized, the valve on the exit line is opened so that the natural gas removes the $CO_2$ along with the other components from the bed. The initial portion of the exit stream in Step 2 that contains majority of the gases trapped in the void volume (including $H_2$), is recycled to be combined with the feed in Step 1. This step is continued for 7-9 min.

Step 3: The natural gas "sweep" is continued for 10 min to release much of the adsorbed $CO_2$ at the high temperature. The exiting gas stream is termed as the "first" off-gas stream, which primarily contains $CH_4$ and $CO_2$, exits via line 124 to a $CO_2$ removal process unit 126. Preferably, the $CH_4$ "sweep" flow rate is adjusted such that the concentration of $CO_2$ in the "first" off gas stream is in the range of 30 mol %-60 mol %, or more preferably 50 mol %-60 mol %.

Returning now to the TSA element 120, at the end of Step 3, the bed is saturated with hot $CH_4$ with small amount of $CO_2$ remaining on the adsorbent.

Step 4: Superheated steam at flow rate in the range of 100 kmol/h-1000 kmol/h is supplied at high temperature in the range 200° C. to 350° C. and at high pressure in the range 10 bar –30 bar to the bed to remove the rest of the methane and the impurities and the "second" off-gas stream is obtained, which is mixed with the $CO_2$ free stream cut from the $CO_2$ removal unit 126 and sent to the SMR unit 106 as a feed. This step is carried out for 10 min.

Step 5: The bed is purged for 10 min with hot and pure $H_2$ stream exiting Step 6. The temperature of the $H_2$ stream exiting Step 5 is increased to the range 100° C.-350° C. using steam or some other source of heat available in the process. The purged $H_2$ stream is sent to the SMR furnace 120 as a fuel or may be supplied as a chemical product or used as a gas turbine fuel.

Step 6: The hot bed is cooled for 10 min by supplying pure $H_2$ produced in Step 1 with flow rate in the range 100 kmol/h-2000 kmol/h until the bed is cooled to a temperature of about 20° C.-100° C., preferably, 40° C.-70° C. to repeat the process.

Note that the cycle time in the above process is taken as 10 min. However, it should be noted that the cycle time is a function of the syngas flow rate, composition, adsorbent bed configuration, nature of the adsorbent and it can vary between 30 sec and 30 min or longer.

Also note that in FIGS. 2 and 3, the streams are shown to enter from the top of the bed; however, any combination of flows, such as co-current and counter-current is possible. This process can be applied as a retrofit to a "new style" SMR plant that would replace the conventional PSA unit with a combination of TSA and $CO_2$ removal unit described here. This process can also be applied to the ATR hydrogen plants. Since the ATR does not have a furnace like SMR, the $H_2$ that has been used for sweeping and cooling steps will be used as a fuel or product elsewhere.

What is claimed:

1. A multi-step process for operating a temperature swing adsorption (TSA) apparatus which comprises:
    Step 1, feeding a shifted gas from a steam methane reformer (SMR) to the adsorbent bed adsorbs to remove gases components other than H2 to produce a high purity H2 stream at high pressure exiting the apparatus and upon saturation of the bed which contains impurities CO2, CO, and CH4 and H2O plus H2 remaining within the bed voids, thereafter;
    Step 2, introducing hot natural gas at high pressure greater than 20 bar and temperatures in excess of 200 to 300° C. to remove the CO2 along with the other components and wherein the CO2 stream may be mixed with a significant amount of H2 so as to decrease the amount of H2 in the CO2 stream so that the gas stream contains majority of the gases trapped in the void volume, including H2, is compressed and recycled to be combined with the feed in Step 1, thereafter;
    Step 3, continuing the natural gas "sweep" to release much of the adsorbed CO2 at the high temperature and wherein the exiting gas stream contains CH4 and CO2, is sent to a CO2 removal process unit and wherein the bed is saturated with hot CH4 with small amount of CO2 remaining on the adsorbent, thereafter;
    Step 4, superheated steam is supplied at high temperature in the range 200° C. to 300° C. and at high pressure in the range 10-30 bar to the bed to remove the remaining methane and the impurities and this second off-gas stream is obtained, which is mixed with the CO2 free stream cut from the CO2 removal unit and cycled to a SMR unit as a feed and, thereafter;

Step 5, the bed, which is now at a high temperature, and saturated with steam, is purged with hot and pure $H_2$ stream produced in Step 1 after heat exchange to remove $H_2$ and $H_2O$, and thereafter;

Step 6, the hot bed is cooled by supplying pure $H_2$ produced in Step 1 until the bed is cooled to a temperature of about 40-70° C. to repeat the process the cycling process.

2. A process to operate a temperature swing adsorption (TSA) apparatus in a stream methane reformer process (SMR) wherein an $H_2$ sweep gas is used, the process comprising:

Step 1 wherein shifted gas from the SMR is fed to adsorbing beds capable of adsorbing impurities other than $H_2$ and wherein high pressure $H_2$ exits to adsorption bed until bed saturation with $CO_2$, CO, and $CH_4$ and $H_2O$ plus $H_2$ remaining and, thereafter;

Step 2, a portion of the purified $H_2$ is heated to 200° C. -300° C. and is sent to the bed to remove the $CO_2$, CO, $CH_4$ impurities and, thereafter;

Step 3, the $H_2$ gas injection is continued to release the adsorbed $CO_2$ at the high temperature wherein the exiting gas stream primarily contains $H_2$ and $CO_2$ with minor amounts of $CH_4$ and CO is sent to a $CO_2$ removal process unit and, thereafter;

Step 4, a portion of the $H_2$ product is supplied to the lower temperature of 40° C.-70° C. to the bed to remove the rest of the $CO_2$ and the impurities and a portion of the gas exiting from Step 4, which is at a higher temperature, after further heat exchange with a medium such as steam, constitutes the hot $H_2$ as an off-gas stream, which is mixed with the $H_2$ stream cut from the $CO_2$ removal unit and sent to the SMR unit as a fuel for the reformer furnace and to permit the process to cycle again.

* * * * *